United States Patent
Sarkar et al.

(10) Patent No.: US 10,572,881 B2
(45) Date of Patent: Feb. 25, 2020

(54) APPLYING ENTITY SEARCH TECHNIQUES TO EXPEDITE ENTITLEMENT RESOLUTION IN SUPPORT SERVICES

(71) Applicant: International Business Machines Corporation, Armonk, NY (US)

(72) Inventors: Soumitra Sarkar, Cary, NC (US); Byungchul Tak, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 15/069,142

(22) Filed: Mar. 14, 2016

(65) Prior Publication Data

US 2017/0262857 A1    Sep. 14, 2017

(51) Int. Cl.
G06F 17/30        (2006.01)
G06Q 30/00        (2012.01)
G06F 16/2458      (2019.01)

(52) U.S. Cl.
CPC ....... *G06Q 30/016* (2013.01); *G06F 16/2471* (2019.01)

(58) Field of Classification Search
None
See application file for complete search history.

(56) References Cited

U.S. PATENT DOCUMENTS

| | | | |
|---|---|---|---|
| 7,313,826 B2 | 12/2007 | Reasons et al. | |
| 7,464,092 B2 | 12/2008 | Lee et al. | |
| 7,502,459 B1 | 3/2009 | Moseley | |
| 7,549,054 B2 | 6/2009 | Brodie et al. | |
| 7,904,319 B1 | 3/2011 | Whear et al. | |
| 8,180,681 B2 | 5/2012 | Pieper et al. | |
| 8,229,861 B1 | 7/2012 | Trandal et al. | |

(Continued)

FOREIGN PATENT DOCUMENTS

KR        100809885 B1        3/2008

OTHER PUBLICATIONS

Disclosed Anonymously, Software License Reconciliation Maintenance Processing, IPCOM000224590D, 2013.

(Continued)

*Primary Examiner* — Hung D Le
(74) *Attorney, Agent, or Firm* — Ryan, Mason & Lewis, LLP

(57) ABSTRACT

Methods, systems, and computer program products for applying entity search techniques to expedite entitlement resolution in support services are provided herein. A computer-implemented method includes automatically processing multiple distributed data sources to identify data sources to be used in entitlement queries, identify data elements within each of the data sources, and implement search-enhancing features across the data sources; automatically searching the collection, in response to an entitlement query failure due to incorrect and/or missing data object values in a set of data object values input for the entitlement query, to identify alternate sets of values; applying a scoring algorithm to each of the alternate sets of values to generate a score that quantifies an amount of matching between each of the alternate sets and the set of data object values input in connection with the entitlement query; and outputting the alternate sets of values having the highest scores.

20 Claims, 4 Drawing Sheets

(56) References Cited

U.S. PATENT DOCUMENTS

| | | |
|---|---|---|
| 8,856,757 B2 | 10/2014 | Lei et al. |
| 8,892,776 B2 | 11/2014 | Wilkinson et al. |
| 8,949,273 B2 | 2/2015 | Main |
| 9,363,638 B1* | 6/2016 | Jones .................... G06F 16/29 |
| 2003/0061104 A1 | 3/2003 | Thomson et al. |
| 2004/0078290 A1 | 4/2004 | Mester |
| 2004/0117383 A1 | 6/2004 | Lee et al. |
| 2005/0015273 A1 | 1/2005 | Iyer |
| 2005/0114226 A1 | 5/2005 | Tripp et al. |
| 2006/0111924 A1 | 5/2006 | Hollich et al. |
| 2008/0270193 A1 | 10/2008 | Beikmann |
| 2010/0185503 A1 | 7/2010 | Drew et al. |
| 2011/0289047 A1* | 11/2011 | Ahuja .................... G06Q 30/00 707/609 |
| 2012/0078813 A1* | 3/2012 | Rose ...................... G06Q 40/00 705/36 R |
| 2013/0013517 A1 | 1/2013 | Gallego et al. |
| 2013/0339089 A1* | 12/2013 | Olsen ................ G06Q 30/0202 705/7.31 |
| 2014/0052645 A1* | 2/2014 | Hawes ................... G06Q 10/20 705/304 |
| 2015/0032610 A1* | 1/2015 | Crowley .............. G06Q 20/102 705/40 |
| 2015/0032611 A1* | 1/2015 | Crowley .............. G06Q 20/102 705/40 |
| 2015/0088845 A1* | 3/2015 | Zhao ..................... G06F 16/951 707/706 |
| 2017/0148092 A1* | 5/2017 | Chang .................. G06Q 40/025 |
| 2017/0150308 A1* | 5/2017 | Jones .................... H04W 4/021 |

OTHER PUBLICATIONS

Disclosed Anonymously, Automatic Method and System using Triggers to Identify and Unlock Additional Service Opportunities from Client Service/Support Information, IPCOM000209849D, 2011.

Pihir et al., Internal Infrastructural Requirements for Fully Efficient and Automate Structured Electronic Invoicing in Small and Medium Size Companies, Transcom 2011—9th European Conference of Young Research and Scientific Workers, 2011.

* cited by examiner

APPLYING ENTITY SEARCH TECHNIQUES TO EXPEDITE ENTITLEMENT RESOLUTION IN SUPPORT SERVICES

FIELD

The present application generally relates to information technology (IT), and, more particularly, to support services management.

BACKGROUND

Technical support services (TSS) include warranty services for providing repairs or replacements to products sold to customers. By way of example, TSS can refer to providing a comprehensive set of services to manage and/or maintain hardware and software of IT systems. Customers commonly purchase warranties or sign maintenance agreement to become entitled to use TSS, and the service provider is commonly responsible for providing certain diagnoses and actions upon customer requests. However, providing prompt service can be challenging for various reasons. For example, customers often provide invalid or incorrect information upon requesting services, which creates difficulties in verifying the service entitlement and adds delays affecting the customer satisfaction. Additionally, certain necessary information may be unknown or unavailable to customers.

Also, new products and services can be continuously released, and related support services must be kept up-to-date accordingly by updating information, adapting processes and/or training staffs. Further, as the data pertaining to the TSS continuously accumulate and evolve over time, information such as contract and/or inventory data can grow to a substantial number of records. Similarly, certain data are frequently replicated and distributed over numerous databases, forming complicated dependencies.

Consequently, existing TSS approaches fail to address the issue of expediting entitlement processes under invalid and/or limited user information.

SUMMARY

In one embodiment of the present invention, techniques for applying entity search techniques to expedite entitlement resolution in support services are provided. An exemplary computer-implemented method can include automatically processing multiple distributed data sources to (i) identify a collection of the data sources to be used in connection with one or more entitlement queries, (ii) identify one or more data elements within each of the data sources, and (iii) implement one or more search-enhancing features across the collection of data sources. Such a method can also include automatically searching the collection of data sources, in response to an entitlement query failure due to at least one incorrect and/or missing data object values present in a set of multiple data object values input in connection with the entitlement query, to identify multiple alternate sets of values for the multiple data objects. Further, such a method can also include applying a scoring algorithm to each of the multiple alternate sets of values to generate a score that quantifies an amount of matching between (i) each of the multiple alternate sets and (ii) the set of multiple data object values input in connection with the entitlement query, and outputting a pre-determined number of the multiple alternate sets of values having the highest scores.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes applying entity search techniques to expedite entitlement resolution in support services. As used herein, an "entitlement" refers to a relationship between a customer and a product/contract entity that makes the customer eligible for services based on general warranties and/or specific/extended warranties associated with the product. As further detailed herein, an entity can be identified by an N-dimensional attribute (that is, a record with "n" number of fields) with values that are distributed across multiple repositories, and potentially duplicated and/or inconsistent. Accordingly, an error in a single attribute value can result in a failure of an entitlement validation.

Consequently, one or more embodiments of the invention include implementing error correction and/or exploration techniques, wherein different entity identity attributes are varied based on nearness measures, and wherein repositories are searched using the variations. Further, in such embodiments, attribute-level fuzzy matching is used to compute similarity scores between an original request and alternate entitlements to return the top-rated results.

By way of example, upon an entitlement failure due to incorrect and/or missing customer-provided information, at least one embodiment of the invention includes searching for the most likely alternate entitlement information by auto-correcting customer input errors. Such an embodiment can include performing offline analysis of multiple data sources to determine a correct and/or appropriate set of data elements to use in a search query based on ground truth information, searching the data sources using formulated queries to explore a variety of alternative entitlements accounting for possible user errors, and scoring a portion of the alternative entitlements using a combination of approximate matching techniques to identify the most likely or promising entitlements.

Figure 1:
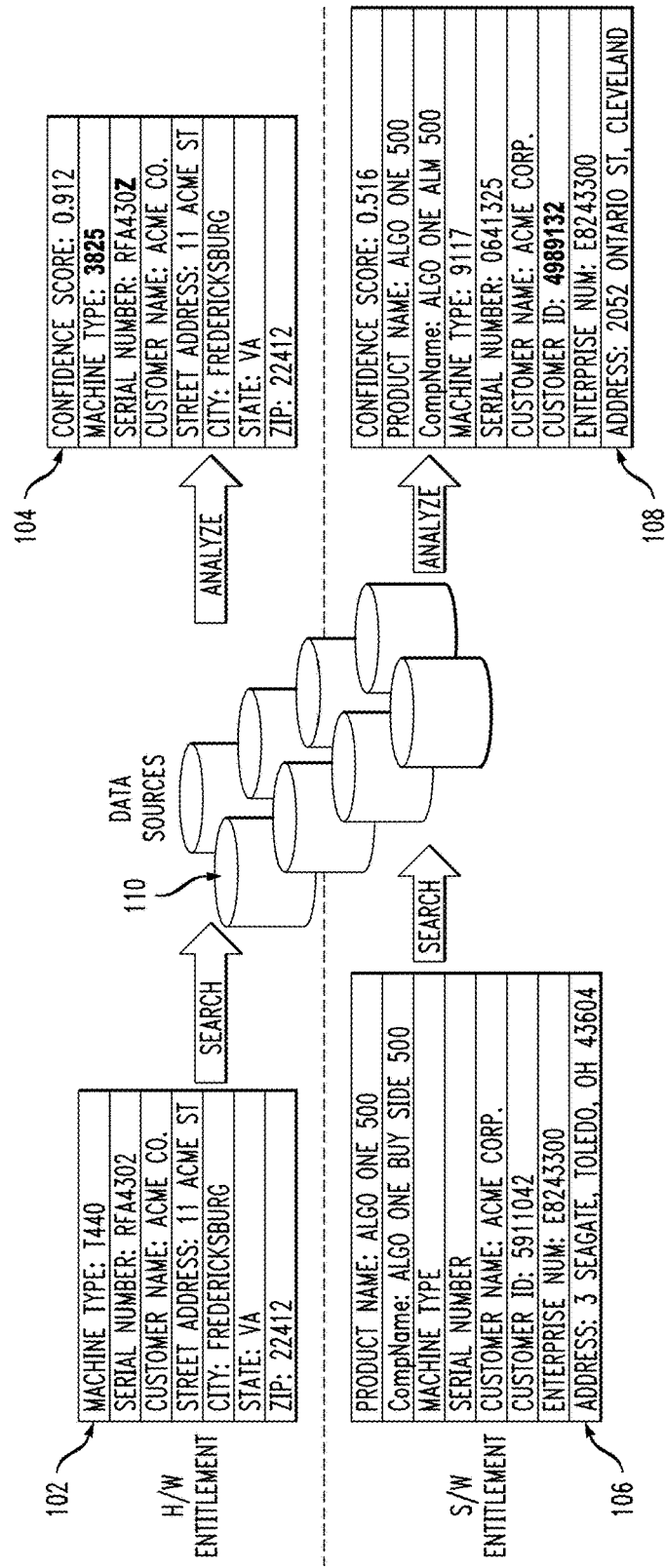
FIG. 1 is a diagram illustrating an entity search problem scenario, according to an embodiment of the invention.

FIG. 1 is a diagram illustrating an entity search problem scenario, according to an embodiment of the invention. By way of illustration, FIG. 1 depicts a hardware (H/w) entitlement search input 102 processed and/or searched over a collection of data sources 110, resulting in the generation of a potential and/or likely correct version of the H/W entitlement search input 104. In this example depicted in FIG. 1, it can be observed that incorrect and/or incomplete information was detected in the "Machine Type" field and the "Serial Number" field, and the resulting search input 104 identified potentially corrected information for those fields, in conjunction with the remaining input fields, with a confidence score of 0.912 (wherein, in this example, the confidence score ranges from 0 to 1).

Additionally, FIG. 1 also depicts a software (S/W) entitlement search input 106 processed and/or searched over the collection of data sources 110, resulting in the generation of a potential and/or likely correct version of the S/W entitlement search input 108. In this example depicted in FIG. 1, it can be observed that incorrect and/or incomplete information was detected in the "Customer ID" (Customer Identifier) field, and the resulting search input 108 identified potentially corrected information for this fields, in conjunction with the remaining input fields, with a confidence score of 0.516.

In the example embodiment of the invention illustrated in FIG. 1, it can be assumed that the collection of data sources 110 includes D databases, each associated with a various subset of the fields in the input data object 102, and wherein such databases may be structured or unstructured. The inputs (such as 102 and 106) can include a data object that includes N fields, wherein M ($\leq$N) fields have incorrect values, but it is initially unknown which fields have incorrect values. By way of example, for an H/W entitlement search input, M=2, and N=6 or 7. Further, for an S/W entitlement search input, N=7, and M=7. Additionally, the output (such as 104 and 108) can include data objects with all of the fields having the highest confidence value (among multiple options).

Entity identification attribute errors can include a variety of errors. For example, for a hardware entitlement search, such errors can include an invalid (or missing) machine type (MT), an invalid (or missing) serial number (SN), and/or a MT-SN pair mismatch. Also, for a software entitlement search, such errors can include an incorrect (or missing) customer number (a single customer, for example, may have many different customer numbers covering multiple products), an incorrect (or missing) product name or identifier (such as, for example, <prodId, version>), an incorrect (or missing) component name or identifier (such as, for example, <compId, release>), and/or an a MT-SN pair mismatch.

At least one embodiment of the invention includes (periodically) performing offline analysis on a given collection of data sources (of entitlement information) by analyzing the data sources to place the data into a format suitable for querying, as well as to identify the correct set of data elements to use in the search query. Such data sources can include, for example, database tables, fields and relationships, as well as unstructured data sources. Such offline analysis can include, for example, identifying frequent patterns in customer product purchase histories to identify one or more product bundle relationships (for example, which MT-SN combinations are commonly packaged together). Offline analysis can also include extracting reference address information from customer information databases to match with address fields in entitlement tables, as well as extracting acronym information for alternate product search expansion and scoring.

At least one embodiment of the invention also includes a search aspect, which can include query formulation. Query formulation can include forming the correct and/or appropriate set of queries to gather the data necessary to build a table of candidate data objects. One or more embodiments of the invention include varying attribute values within the process of query formulation, such as implementing serial number expansion and/or alternate product and/or component name expansion. Additionally, at least one embodiment of the invention can include implementing one or more heuristics to limit the number of results (to a user-specified amount, for example) to limit search wait time. Such heuristics can include, for example, implementing approximate string matching to find the nearest matching alternate names of products and/or components from a master list, and/or utilizing a product taxonomy to supplement approximate string matching. One or more embodiments can additionally include implementing a weighted scoring function to select which alternates to include in a query.

Figure 2:
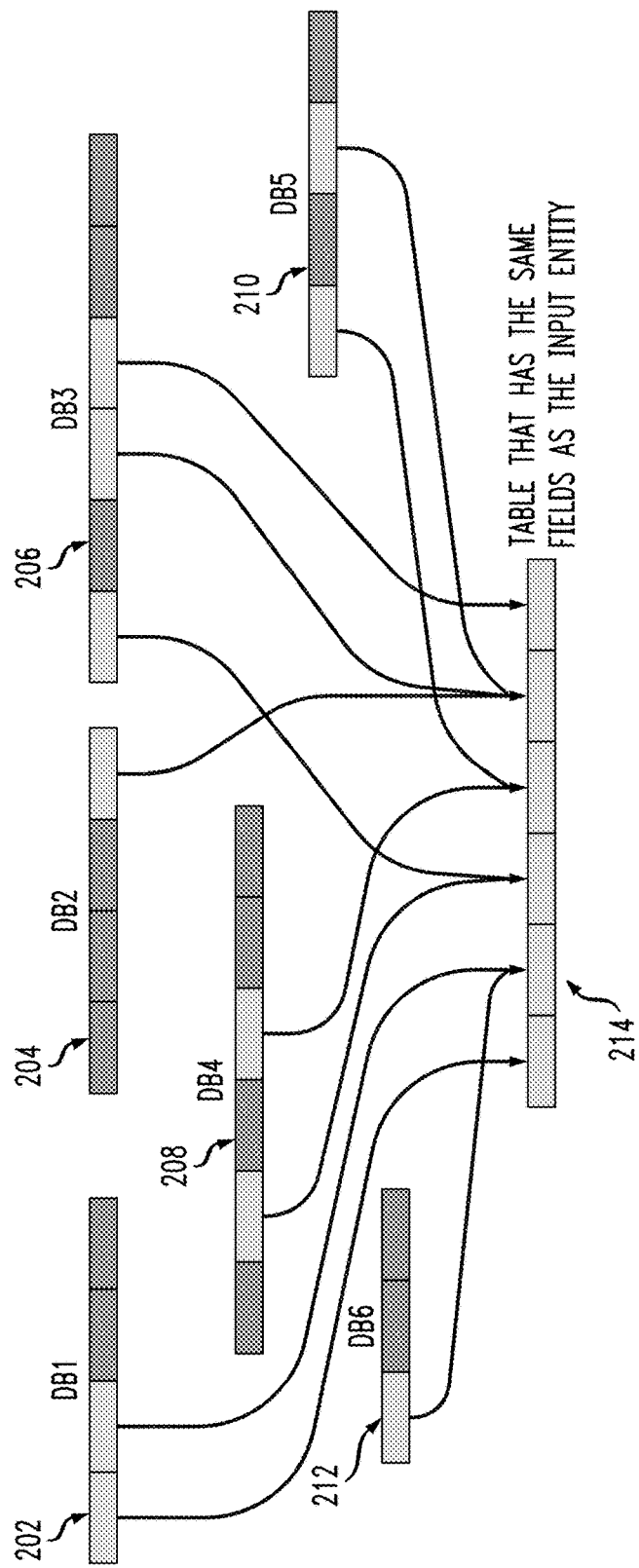
FIG. 2 is a diagram illustrating a search aspect, according to an exemplary embodiment of the invention.

FIG. 2 is a diagram illustrating a search aspect, according to an exemplary embodiment of the invention. By way of illustration, FIG. 2 depicts drawing particular data fields from a collection of multiple distinct databases (database (DB) 202, DB 204, DB 206, DB 208, DB 210, and DB 212) to construct a (virtual) table 214 by joining the derived fields from the above-noted distinct databases. By way of example, the multiple distinct database used to construct the resulting (virtual) table 214 can each be directed to distinct types of data. For instance, DB 202 can include customer number data, DB 204 can include entitlement information, DB 206 can include a master list of all products and components, DB 208 can include a subject matter-specific repository, DB 210 can include service request history information, and DB 212 can include S/W and/or H/W contract information. The resulting table 214 can be constructed to meet user- or query-specific parameters such as, for example, including the same fields as an input entity. Accordingly, at least one embodiment of the invention includes drawing from the multiple distinct databases to construct the resulting table 214 as desired or necessary.

Further, at least one embodiment of the invention includes a scoring aspect which can include applying a scoring algorithm to each candidate result object. Such a scoring algorithm can include, for example, a multi-dimensional weighted score, wherein the weights can be learned using machine learning (ML) techniques. One example ML technique can include a gradient descent in which the weights are gradually varied toward improving the final output. Another example technique can include simulated annealing, which navigates the search space by probabilistically jumping from one weight set to another. As the algorithm runs, the magnitude of the jumps decreases with the hope that the global maxima is to be reached.

Additionally, one or more embodiments of the invention can include tuning the scoring algorithm via auto-testing with feedback loop. In a brute force way, given the past record history, multiple different similarity search functions can be attempted and/or utilized to determine which function produces the best result. Such similarity functions can include, for example, the Levenstein distance, the Jaro-Winkler (JW) distance, the Jaccard (JAC) index, the Monge-Elkan (ME) method, etc. Also, at least one embodiment of the invention includes generating ranked lists of data objects (ranked according to score), and optionally including a corresponding justification of the score for each data object. A threshold can also be applied to the ranked list for final output and/or presentation to user (that is, only a certain number of the listed data objects would be output).

Figure 3:
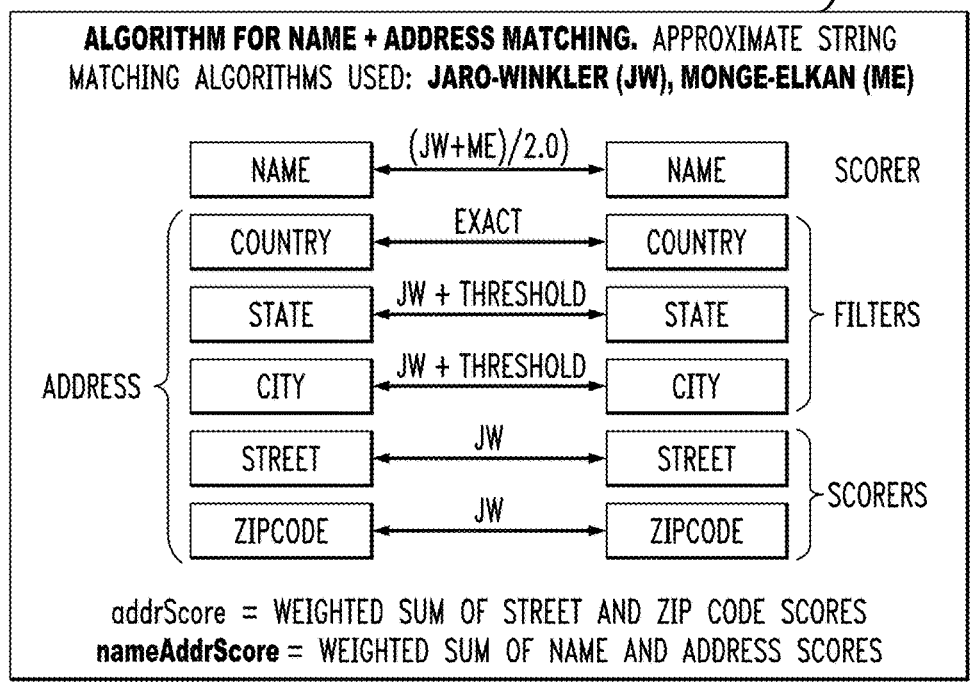
FIG. 3 is a diagram illustrating a scoring aspect, according to an exemplary embodiment of the invention.
Figure 3:
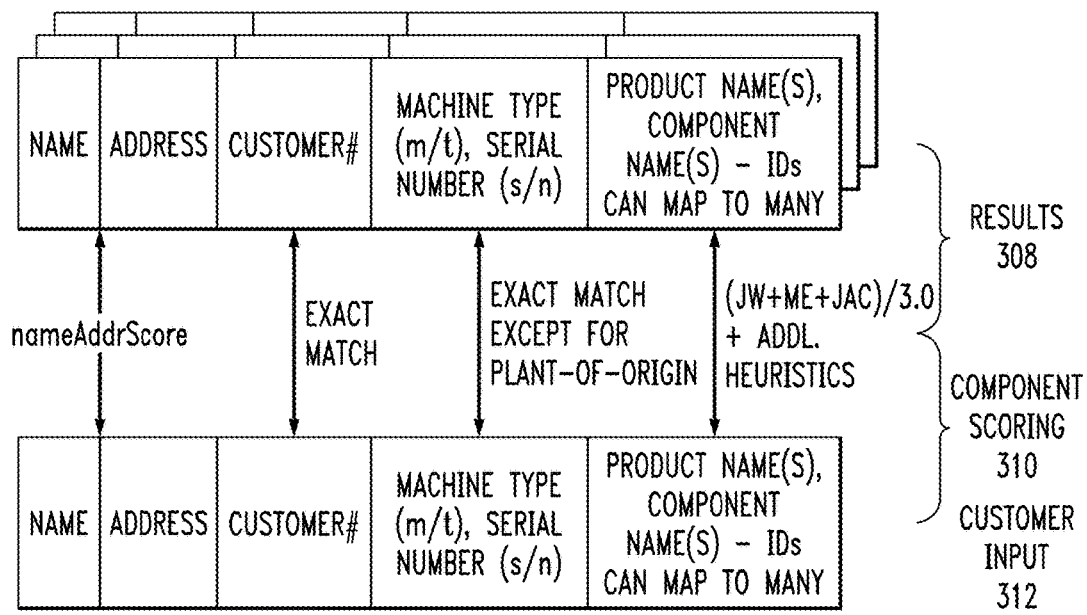

FIG. 3 is a diagram illustrating a scoring aspect, according to an exemplary embodiment of the invention. By way of illustration, FIG. 3 depicts a detailed scoring logic that can be used in an entitlement search. Based on a formulated query, results 308 are generated, and component scoring 310 is carried out by comparing the results 308 with the customer input 312. Additionally, as depicted, element 304 explains how the component score for the name and address components are carried out. For the name component, two string distance functions are applied and averaged. For the country, state and city components, the scores are accepted only when they are above a certain threshold. The street and zip code scores are used as is. The different treatments of these components can be based on the particular analysis. All of the component scores are combined to compute the customer score (custScore) value, and once this value is obtained, at least one embodiment of the invention includes using the value in the component scoring 310, with other scores, to compute the final score. The other scores can be derived from the customer number, the machine type, the serial number, the product ID, and/or the component names. Additionally, one or more embodiments of the invention can include treating each component differently to maximize the score accuracy. For example, it can be determined that the product ID and component name scores produced better results with the combination of JW, ME and JAC distances.

Figure 4:
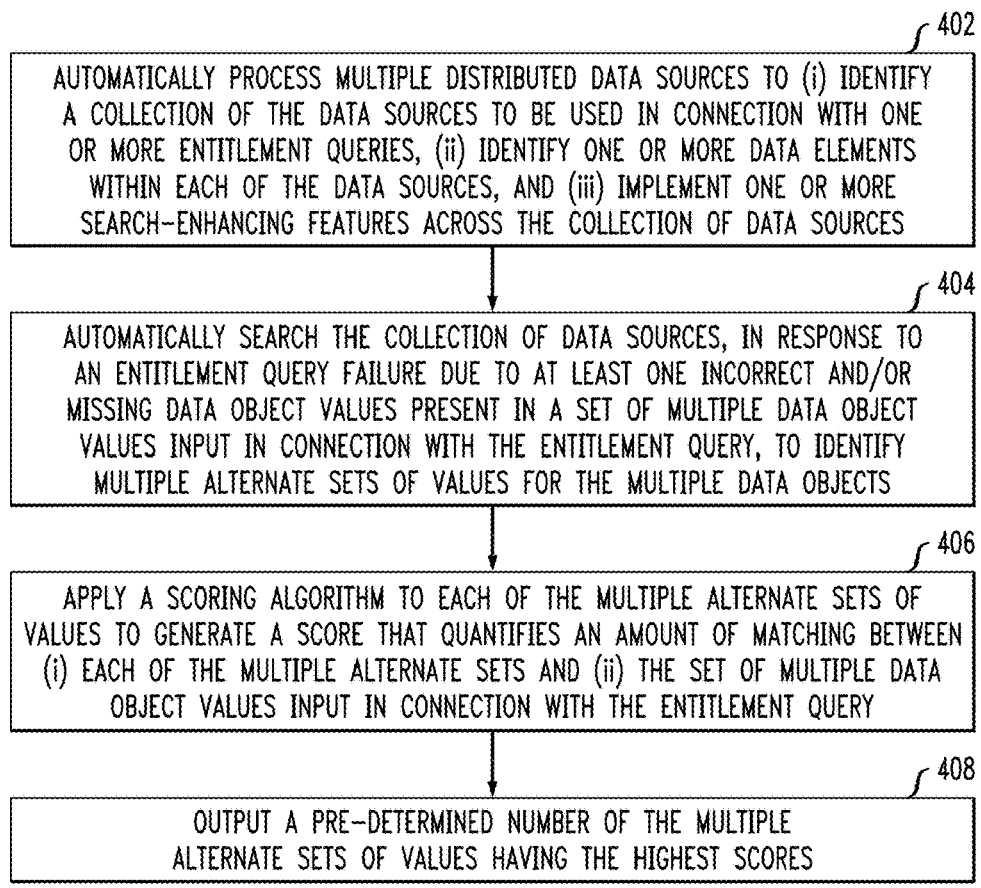
FIG. 4 is a flow diagram illustrating techniques according to an embodiment of the invention.

FIG. 4 is a flow diagram illustrating techniques according to an embodiment of the present invention. Step 402 includes automatically processing multiple distributed data sources to (i) identify a collection of the data sources to be used in connection with one or more entitlement queries, (ii) identify one or more data elements within each of the data sources, and (iii) implement one or more search-enhancing features across the collection of data sources. Identifying the collection of data sources can include identifying one or more targeted fields in the multiple distributed data sources, as well as identifying one or more relationships among the one or more targeted fields in the multiple distributed data sources. Also, the multiple distributed data sources can include one or more structured data sources and/or one or more unstructured data sources.

Each of the multiple distributed data sources can include data pertaining to a distinct entitlement query search input category. In one or more embodiments of the invention, the distinct entitlement query search input category can include one of (i) machine type, (ii) serial number, (iii) customer name, (iv) customer street address, (v) customer city, (vi) customer state, and (vii) customer zip code. Also, in one or more embodiments of the invention, the distinct entitlement query search input category can include one of (i) product name, (ii) component name, (iii) machine type, (iv) serial number, (v) customer name, (vi) customer identifier, and (vii) customer address.

Further, implementing one or more search-enhancing features can include searching for one or more patterns across the collection of data sources to identify one or more relationships between two or more products, expanding one or more entitlement query search input values to a set of alternative values that are determined to likely to be true values under an assumed model of user input mistakes, and/or extracting acronym information from the collection of data sources to identify one or more alternate entitlement query search terms.

Step 404 includes automatically searching the collection of data sources, in response to an entitlement query failure due to at least one incorrect and/or missing data object values present in a set of multiple data object values input in connection with the entitlement query, to identify multiple alternate sets of values for the multiple data objects. At least one embodiment of the invention can additionally include implementing one or more heuristics to limit the number of identified alternate sets of values to a predefined number.

Step 406 includes applying a scoring algorithm to each of the multiple alternate sets of values to generate a score that quantifies an amount of matching between (i) each of the multiple alternate sets and (ii) the set of multiple data object values input in connection with the entitlement query. The scoring algorithm can include a multi-dimensional weighted scoring algorithm, wherein distinct weights are attributed to each of the multiple data object values. Additionally, at least one embodiment of the invention can include tuning the scoring algorithm via auto-testing with a feedback loop.

Step 408 includes outputting a pre-determined number of the multiple alternate sets of values having the highest scores. At least one embodiment of the invention can also include generating a ranked list of the multiple alternate sets of values in an order of highest score to lowest score, as well as generating a descriptive justification of the score generated for each of the multiple alternate sets of values.

In one or more embodiments of the invention, step 402 is a process that repeats periodically and independently. Additionally, when a new entitlement request is made, such a request triggers steps 404, 406 and 408. Further, in such an embodiment, step 402 generates outputs such as, for example, the list of database table fields to use for the query (serial number—machine type match table, acronym table, etc.), and these outputs are used by steps 404, 406, 408 on each request.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
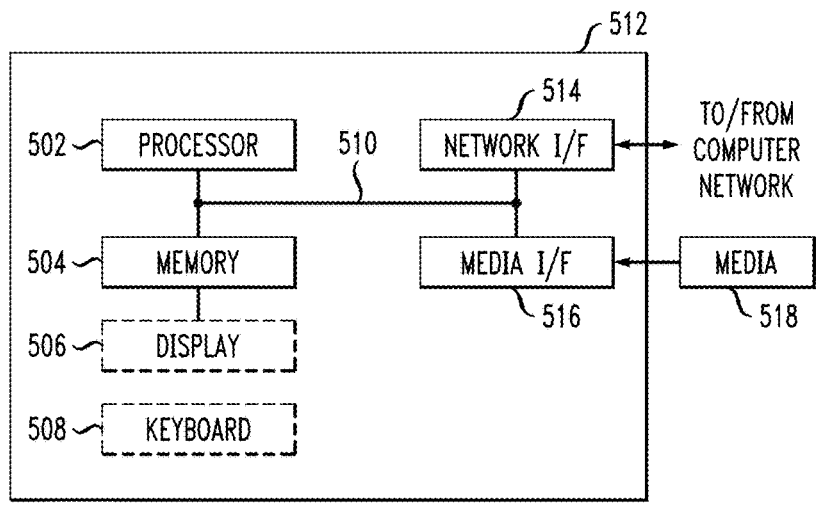
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that one or more embodiments of the invention are capable of being implemented in conjunction with any type of computing environment now known, such as cloud computing, or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing matching techniques to identify the most promising entitlements among a pool of alternatives.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   automatically processing multiple distributed data sources to (i) identify a collection of the data sources to be used in connection with one or more entitlement queries, (ii) identify one or more data elements within each of the data sources, and (iii) implement one or more search-enhancing features across the collection of data sources;
   automatically searching the collection of data sources, in response to an entitlement query failure due to at least one incorrect and/or missing data object values present in a set of multiple data object values input in connection with the entitlement query, to identify multiple alternate sets of values for the multiple data objects, wherein the entitlement query failure is identified via analysis of at least a portion of the set of multiple data object values in connection with a correct set of data elements to be used in the entitlement query;
   applying a scoring algorithm to each of the multiple alternate sets of values to generate a score that quantifies an amount of matching between (i) each of the multiple alternate sets and (ii) the set of multiple data object values input in connection with the entitlement query; and
   outputting a pre-determined number of the multiple alternate sets of values having the highest scores;
   wherein the steps are carried out by at least one computing device.

2. The computer-implemented method of claim 1, wherein said identifying the collection of data sources comprises identifying one or more targeted fields in the multiple distributed data sources.

3. The computer-implemented method of claim 2, wherein said identifying the collection of data sources comprises identifying one or more relationships among the one or more targeted fields in the multiple distributed data sources.

4. The computer-implemented method of claim 1, wherein the multiple distributed data sources comprise one or more structured data sources.

5. The computer-implemented method of claim 1, wherein the multiple distributed data sources comprise one or more unstructured data sources.

6. The computer-implemented method of claim 1, wherein each of the multiple distributed data sources comprise data pertaining to a distinct entitlement query search input category.

7. The computer-implemented method of claim 6, wherein said distinct entitlement query search input category comprises one of (i) machine type, (ii) serial number, (iii) customer name, (iv) customer street address, (v) customer city, (vi) customer state, and (vii) customer zip code.

8. The computer-implemented method of claim 6, wherein said distinct entitlement query search input category comprises one of (i) product name, (ii) component name, (iii) machine type, (iv) serial number, (v) customer name, (vi) customer identifier, and (vii) customer address.

9. The computer-implemented method of claim 1, wherein said implementing one or more search-enhancing features comprises searching for one or more patterns across the collection of data sources to identify one or more relationships between two or more products.

10. The computer-implemented method of claim 1, wherein said implementing one or more search-enhancing features comprises expanding one or more entitlement query search input values to a set of alternative values that are determined to likely to be true values under an assumed model of user input mistakes.

11. The computer-implemented method of claim 1, wherein said implementing one or more search-enhancing features comprises extracting acronym information from the collection of data sources to identify one or more alternate entitlement query search terms.

12. The computer-implemented method of claim 1, comprising:
implementing one or more heuristics to limit the number of identified alternate sets of values to a predefined number.

13. The computer-implemented method of claim 1, wherein the scoring algorithm comprises a multi-dimensional weighted scoring algorithm, wherein distinct weights are attributed to each of the multiple data object values.

14. The computer-implemented method of claim 1, comprising:
tuning the scoring algorithm via auto-testing with a feedback loop.

15. The computer-implemented method of claim 1, comprising:
generating a ranked list of the multiple alternate sets of values in an order of highest score to lowest score.

16. The computer-implemented method of claim 1, comprising:
generating a descriptive justification of the score generated for each of the multiple alternate sets of values.

17. A computer program product comprising a computer readable storage medium having program instructions embodied therewith, the program instructions executable by a device to cause the device to:
automatically process multiple distributed data sources to (i) identify a collection of the data sources to be used in connection with one or more entitlement queries, (ii) identify one or more data elements within each of the data sources, and (iii) implement one or more search-enhancing features across the collection of data sources;
automatically search the collection of data sources, in response to an entitlement query failure due to at least one incorrect and/or missing data object values present in a set of multiple data object values input in connection with the entitlement query, to identify multiple alternate sets of values for the multiple data objects, wherein the entitlement query failure is identified via analysis of at least a portion of the set of multiple data object values in connection with a correct set of data elements to be used in the entitlement query;
apply a scoring algorithm to each of the multiple alternate sets of values to generate a score that quantifies an amount of matching between (i) each of the multiple alternate sets and (ii) the set of multiple data object values input in connection with the entitlement query; and
output a pre-determined number of the multiple alternate sets of values having the highest scores.

18. The computer program product of claim 17, wherein the program instructions executable by a computing device further cause the computing device to:
generate a ranked list of the multiple alternate sets of values in an order of highest score to lowest score.

19. The computer program product of claim 17, wherein the program instructions executable by a computing device further cause the computing device to:
generate a descriptive justification of the score generated for each of the multiple alternate sets of values.

20. A system comprising:
a memory; and
at least one processor coupled to the memory and configured for:
automatically processing multiple distributed data sources to (i) identify a collection of the data sources to be used in connection with one or more entitlement queries, (ii) identify one or more data elements within each of the data sources, and (iii) implement one or more search-enhancing features across the collection of data sources;
automatically searching the collection of data sources, in response to an entitlement query failure due to at least one incorrect and/or missing data object values present in a set of multiple data object values input in connection with the entitlement query, to identify multiple alternate sets of values for the multiple data objects, wherein the entitlement query failure is identified via analysis of at least a portion of the set of multiple data object values in connection with a correct set of data elements to be used in the entitlement query;
applying a scoring algorithm to each of the multiple alternate sets of values to generate a score that quantifies an amount of matching between (i) each of the multiple alternate sets and (ii) the set of multiple data object values input in connection with the entitlement query; and
outputting a pre-determined number of the multiple alternate sets of values having the highest scores.

* * * * *